(12) United States Patent
Nakayama (10) Patent No.: US 10,355,270 B2
(45) Date of Patent: Jul. 16, 2019

(54) POSITIVE ELECTRODE MATERIAL FOR LITHIUM SECONDARY BATTERY AND MANUFACTURING METHOD THEREOF

(71) Applicant: TOYOTA JIDOSHA KABUSHIKI KAISHA, Toyota-shi, Aichi (JP)

(72) Inventor: Tetsuri Nakayama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 152 days.

(21) Appl. No.: 15/229,484

(22) Filed: Aug. 5, 2016

(65) Prior Publication Data

US 2017/0040601 A1      Feb. 9, 2017

(30) Foreign Application Priority Data

Aug. 7, 2015   (JP) .................. 2015-157774

(51) Int. Cl.
```
H01M 4/02       (2006.01)
H01M 4/36       (2006.01)
H01M 4/58       (2010.01)
H01M 4/62       (2006.01)
H01M 4/505      (2010.01)
H01M 4/525      (2010.01)
H01M 10/052     (2010.01)
H01M 10/0525    (2010.01)
```
(52) U.S. Cl.
CPC .......... *H01M 4/366* (2013.01); *H01M 4/505* (2013.01); *H01M 4/525* (2013.01); *H01M 4/5825* (2013.01); *H01M 10/0525* (2013.01); *H01M 4/621* (2013.01); *H01M 10/052* (2013.01); *H01M 2004/028* (2013.01); *H01M 2300/004* (2013.01)

(58) Field of Classification Search
None
See application file for complete search history.

(56) References Cited

U.S. PATENT DOCUMENTS

| | | |
|---|---|---|
| 2005/0208384 A1 | 9/2005 | Yanai et al. |
| 2013/0171518 A1 | 7/2013 | Chang et al. |
| 2014/0050976 A1* | 2/2014 | Nagai .......... H01M 4/131 429/211 |

(Continued)

FOREIGN PATENT DOCUMENTS

| | | |
|---|---|---|
| CN | 102971893 A | 3/2013 |
| CN | 103098267 A | 5/2013 |

(Continued)

*Primary Examiner* — Daniel S Gatewood
(74) *Attorney, Agent, or Firm* — Sughrue Mion, PLLC (57) ABSTRACT

Provided is a positive electrode material for a lithium secondary battery that excels in durability and has a high electron conductivity (typically, a low battery resistance). A positive electrode material for a lithium secondary battery, which is provided by the present invention, includes positive electrode active material particles that can reversibly store and release a charge carrier, and lithium phosphate. Each of the positive electrode active material particles has a hollow structure having a shell configured of primary particles and a hollow portion formed inside the shell. Lithium phosphate is disposed inside the hollow portion, and no lithium phosphate is disposed on the outer circumferential surface of each of the positive electrode active material particles.

4 Claims, 6 Drawing Sheets

(56) References Cited

U.S. PATENT DOCUMENTS

2015/0180036 A1* 6/2015 Takebayashi ........... H01M 4/13
                                                               429/319

FOREIGN PATENT DOCUMENTS

| JP | 2005-268017 A | 9/2005 | |
|----|---------------|--------|---|
| JP | 2013-191579 A | 9/2013 | |
| JP | 2014-103098 A | 6/2014 | |
| WO | WO-2013089426 A1 * | 6/2013 | ........... C01B 25/455 |

* cited by examiner

POSITIVE ELECTRODE MATERIAL FOR LITHIUM SECONDARY BATTERY AND MANUFACTURING METHOD THEREOF

BACKGROUND OF THE INVENTION

1. Field of the Invention

The present invention relates to a positive electrode material for a lithium secondary battery, and to a manufacturing method thereof.

The present application claims priority to Japanese Patent Application No. 2015-157774 filed on Aug. 7, 2015, the entire contents of which are hereby incorporated by reference.

2. Description of the Related Art

Lithium secondary batteries (lithium ion secondary batteries) have recently found use as the so-called portable power sources for, for example, personal computers and portable terminals, and as drive power sources for vehicles. In particular, lightweight lithium secondary batteries (lithium ion secondary batteries), which make it possible to obtain a high energy density, have been advantageously used as high-output drive power sources for vehicles such as electric vehicles and hybrid vehicles.

When a lithium ion secondary battery is charged, lithium ions are released (desorbed) from the interior of a positive electrode active material, and when the battery is discharged, the lithium ions are conversely stored (inserted) in the positive electrode active material. The positive electrode active material is known to expand and contract repeatedly following such storage and release (typically, insertion and desorption) of lithium ions.

The positive electrode active material is typically used in the form of secondary particles formed by aggregation of a large number of fine primary particles. It is well known that due to the expansion and contraction of the positive electrode active material, secondary particles of the positive electrode active material may induce fracture (including cracking) between the primary particles with weak bonding forces. Typically no contact with an electrically conductive material is realized in the locations where the fracture has occurred (fractured portion). Therefore, the electron conductivity decreases and the formation of conduction paths between the positive electrode active material particles is likely to be inhibited. Thus, the internal resistance of the battery can rise and cycle characteristics can degrade.

In order to resolve this problem, Japanese Patent Application Publication No. 2013-191579 discloses a method for suppressing the generation of fracture between the primary particles of a positive electrode active material by using a positive electrode material including a lithium compound on the outer circumferential surface of the positive electrode active material particles.

SUMMARY OF THE INVENTION

However, where a lithium compound is present on the surface (outer circumferential surface) of the positive electrode active material particles, the contact surface area of the positive electrode active material particles and the electrically conductive material tends to be reduced, and the lithium compound can inhibit the formation of conduction paths in the positive electrode active material. Thus, the electron conductivity of a positive electrode material in which a lithium compound is present on the outer circumferential surface of positive electrode active material particles tends to decrease. The decrease in electron conductivity of the positive electrode material can result in the increase of battery resistance of a lithium secondary battery constructed by using the positive electrode material.

With the foregoing in view, it is an objective of the present invention to provide a positive electrode material that can demonstrate a high electron conductivity and excels in durability (positive electrode active material particles are unlikely to be fractured even in repeated charging and discharging).

To attain the above-mentioned objective, the present invention provides a positive electrode material for use in a lithium secondary battery, including positive electrode active material particles that can reversibly store and release a charge carrier; and lithium phosphate. Each positive electrode active material particle has a hollow structure having a shell configured of primary particles and a hollow portion formed inside the shell, lithium phosphate is disposed in the hollow portion, and no lithium phosphate is disposed on the outer circumferential surface of the positive electrode active material particle.

With the positive electrode material of the above-described configuration, since a lithium compound (typically, lithium phosphate) is disposed in the hollow portions of the positive electrode active material particles, the positive electrode active material particles can be prevented from fracturing (typically, separation of the primary particles from each other). Further, in the positive electrode material of the above-described configuration, since no lithium phosphate is disposed on the outer circumferential surface of the positive electrode active material particles, the surface area of contact between the positive electrode active material and electrically conductive material can be ensured. Thus, with the positive electrode material of the above-described configuration, a high electron conductivity and excellent durability can be realized.

Therefore, the present invention can provide a lithium secondary battery including a positive electrode having a positive electrode active material layer including any of the positive electrode materials disclosed herein, and a negative electrode. Such a lithium secondary battery has a low battery resistance and excels in durability (for example, cycle characteristics).

In the present specification, the "outer circumferential surface of a positive electrode active material particle" means the surface of the positive electrode active material particle (secondary particle) which is in contact with the outside of the particle. Thus, it is part of the surface of the shell constituting the secondary particle of the positive electrode active material particle, this part being in contact with the outside of the secondary particle. In other words, it is the surface of the shell which does not include the surfaces which are in contact with the hollow portion and the below-described through holes.

In a desired embodiment of the positive electrode material disclosed herein, lithium phosphate is included in the positive electrode material in an amount from 0.1 part by mass to 4 parts by mass per 100 parts by mass of the positive electrode active material particles.

Where the amount of the lithium compound in the positive electrode active material particles is within this range, the effect of suppressing the occurrence of fracture in the positive electrode active material particles can be demonstrated at a high level, while maintaining the amount of the positive electrode active material in the positive electrode material.

In a desired embodiment of the positive electrode material disclosed herein, the positive electrode active material is a lithium transition metal oxide including at least nickel, cobalt, and manganese.

Such a lithium transition metal oxide can be advantageously used as the positive electrode active material of a lithium secondary battery. Further, such a lithium transition metal oxide excels in crystal structure stability and can be advantageously used in the lithium secondary battery disclosed herein.

Another aspect of the present invention resides in a method for manufacturing any of the positive electrode materials disclosed herein, the method including the following steps (i) to (iv).

(i) preparing positive electrode active material particles that can reversibly store and release a charge carrier, each of the positive electrode active material particles having a hollow structure having a shell configured of primary particles and a hollow portion formed inside the shell;

(ii) mixing the positive electrode active material particles with a reaction starting material of lithium phosphate;

(iii) disposing the reaction starting material of lithium phosphate at least in hollow portions of the positive electrode active material particles by using moisture in the air or added moisture; and (iv) generating lithium phosphate from the reaction starting material of lithium phosphate disposed in the hollow portions of the positive electrode active material particles, and disposing lithium phosphate in the hollow portions of the positive electrode active material particles.

As indicated hereinabove, a positive electrode material in which a lithium compound (typically, lithium phosphate) is disposed in the hollow portions of positive electrode active material particles can be adequately manufactured by disposing the reaction starting material of the lithium compound (typically, lithium phosphate) in the hollow portions of positive electrode active material particles by using moisture in the air or added moisture, and then generating the lithium compound from the reaction starting material of a lithium compound (typically, lithium phosphate).

DESCRIPTION OF THE PREFERRED EMBODIMENTS

The embodiment of the present invention will be explained hereinbelow in greater detail with reference to the appended drawings. It should be noted that matters necessary for carrying out the present invention other than those specifically referred to in the description are understood to be matters of design for a person skilled in the art which are based on the related art in the pertinent field. The present invention can be implemented on the basis of the contents disclosed in the present specification and the common technical knowledge in the pertinent field.

In the below-described drawings, components and parts producing the same action are assigned with same reference numerals, and the redundant explanation thereof is omitted or simplified. The dimensional relationships (length, width, height, etc.) in the drawings do not necessarily reflect actual dimensional relationships.

Figure 1:
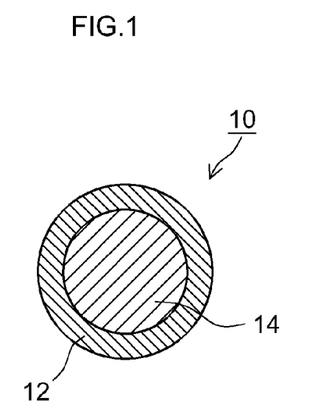
FIG. 1 is a cross-sectional view illustrating schematically the configuration of the positive electrode material according to an embodiment.

As depicted in FIG. 1, a positive electrode material 10 disclosed herein has a positive electrode active material particle 12 and a lithium compound 14. The positive electrode active material particle 12 constituting the positive electrode material 10 is of a hollow structure having a shell configured of primary particles and a hollow portion formed inside of the shell. Further, as depicted in FIG. 1, the lithium compound 14 is disposed inside the hollow portion of the positive electrode active material particle 12. Further, it is desired that the lithium compound 14 be not disposed on the outer circumferential surface of the positive electrode active material particle 12. The positive electrode material 10 disclosed herein can be used in a positive electrode for a lithium secondary battery and the like having a positive electrode active material, and this positive electrode material can be used in a lithium secondary battery having the positive electrode as a constituent element.

The positive electrode active material particle 12 constituting the positive electrode material 10 is shaped to have a hollow structure having a shell and a hollow portion (void) formed inside thereof. Such a particle shape typically can be a generally spherical shape or a somewhat distorted spherical shape. A particle of a typical porous structure (solid structure) can be contrasted against a particle with such hollow structure. The porous structure, as referred to herein is a structure (sponge-like structure) in which solid portions and void portions are present together across the entire particle. The active material particle with a hollow structure, which is disclosed herein, is structurally clearly distinguishable from the active material particle of a porous structure in that the solid portion is eccentrically located in the shell, and the large space is clearly formed in the hollow portion.

The shell is obtained by aggregation of primary particles into a spherical shell shape. In the desired embodiment, in the observation image of the shell cross section obtained with an electron microscope (for example, a scanning electron microscope (SEM)), the primary particles are disposed annularly (beaded configuration). Here, the primary particle refers to a particle that is considered as a unit particle (ultimate particle) when judged by the external appearance of the geometrical form thereof. In the positive electrode active material particle disclosed herein, the primary particle can have the same composition as that of the positive electrode active material for the conventional lithium secondary battery. Typically, the primary particle is an aggregation of crystallites of a lithium transition metal oxide.

The positive electrode active material particle 12 desirably has through holes which spatially connect (communicate) the hollow portion with the outside (outside the particle) through the shell. The positive electrode active material particle 12 of a hollow structure is hereinbelow assumed, unless specifically stated otherwise, to be inclusive of hollow structures having such through holes in the shell.

Because of such through holes, the lithium compound 14 can be easily disposed inside the hollow portion.

Where the number of the through holes in the positive electrode active material particle 12 is too large, the strength of the active material particle tends to decrease and the hollow structure is often difficult to maintain. For this reason, it is desired that the average of through holes (the average number of through holes) per one positive electrode active material particle 12 be about 20 or less (for example, about 1 to 10, typically, 1 to 5).

The shape of the positive electrode active material particle 12 (for example, the shape of the hollow portion and shell and the average number of through holes) can be determined, for example, by SEM observations of the cross section of the positive electrode active material particle 12.

In the desired embodiment, primary particles are sintered to each other through the shell portions other than the through holes. Such an active material particle is desired because it is unlikely to collapse and has high shape retention ability. It is more desired that the primary particles be densely sintered to each other (generally, at least to a degree such that a typical electrolytic solution cannot pass therebetween, for example, to a degree such that substantially no gaps are present at the boundaries of the primary particles in SEM observations).

The BET specific surface area of the positive electrode active material particle 12 can be, for example, within a range of 0.5 to 1.9 m$^2$/g (for example, 1.0 to 1.9 m$^2$/g), although this range is not particularly limiting. Positive electrode active material particles with such a BET specific surface area are desired because a lithium secondary battery equipped with the positive electrode material 10 including such positive electrode active material particles 12 can demonstrate excellent battery performance (for example, a low battery resistance and excellent cycle characteristic). A value measured by a typical nitrogen adsorption method can be used as the specific surface area.

Further, the average particle size of the positive electrode active material particles 12 is not particularly limited and can be, for example, from 2 μm (desirably, 5 μm or greater) to 25 μm (typically, 15 μm or less, desirably 10 μm or less). Where the average particle size is too small, the volume of the hollow portions tends to decrease and the durability improvement effect (effect of suppressing the fracture of positive electrode active material particles) which is demonstrated by the lithium compound disposed inside the hollow portions tends to be reduced. Meanwhile, where an attempt is made to ensure the sufficient volume of hollow portions in the positive electrode active material particles 12 with a small particle size, the shell thickness of the active material particle decreases and the strength of the active material particle can decrease. From the standpoint of productivity, etc., of the positive electrode active material particles 12, it is desired that the average particle size be about 25 μm or less. A value determined by a typical particle size distribution measurement using a laser diffraction method can be used as the average particle size of the positive electrode active material particles 12.

Typical positive electrode active materials for lithium secondary batteries can be used, without any particular limitation, for the positive electrode active material particles 12 (that is, primary particles constituting the shell of the positive electrode active material particles 12) constituting the positive electrode material 10 disclosed herein. For example, a lithium transition metal oxide including lithium (Li) and a transition metal (Me) as constituent metal elements can be used. For example, a material having a spinel-type crystal structure or a layered crystal structure can be used. Examples of layered lithium transition metal oxides include lithium transition metal oxides including at least one or more metal element selected from a group configured of nickel (Ni), cobalt (Co), and manganese (Mn) as the abovementioned transition metal (Me).

The abovementioned lithium transition metal oxide may further include a transition metal (Mt) other than the Ni, Co, and Mn. Examples of the transition metal (Mt) other than the Ni, Co, and Mn include magnesium (Mg), calcium (Ca), tungsten (W), strontium (Sr), titanium (Ti), zirconium (Zr), vanadium (V), niobium (Nb), chromium (Cr), molybdenum (Mo), iron (Fe), rhodium (Rh), palladium (Pd), platinum (Pt), copper (Cu), zinc (Zn), boron (B), aluminum (Al), gallium (Ga), indium (In), tin (Sn), lanthanum (La), and cerium (Ce).

The average composition represented by General Formula (I) hereinbelow is an exemplary embodiment of the composition of the positive electrode active material particles 12.

$$Li_{1+x}(Ni_a Co_b Mn_c Mt_d)O_2 \qquad (I)$$

Mt in Formula (I) above is not present or is one or two or more of transition metals (Mt) other than the Ni, Co, and Mn listed hereinabove. Further, x, a, b, c, and d in Formula (I) satisfy the following relationships. Thus, x in the formula, is a value determined such as to fulfill the charge neutrality conditions, and this value satisfies the relationship $0.95 \le 1+x \le 1.3$ (for example, $1.1 \le 1+x \le 1.2$). Further, a, b, c, and d are such that $a \times b \times c \ne 0$ and $a+b+c+d \approx 1$. In Formula (1), "$a+b+c+d \approx 1$" means that the condition of $0.9 \le a+b+c+d \le 1.2$ (typically, $0.95 \le a+b+c+d \le 1.1$) is generally fulfilled, for example, $a+b+c+d=1$. Further, a, b, c, and d fulfill the following conditions: $0 \le a \le 0.7$, $0 \le b \le 0.7$, $0 \le c \le 0.7$, $0 \le d \le 0.2$. The values of x, a, b, c, and d can change depending on the ratio of the elements.

The desired example of the aforementioned lithium transition metal oxides is an oxide (LiNiCoMn oxide) including nickel, cobalt, and manganese as the transition metal (Me). For example, a LiNiCoMn oxide is desired for which in Formula (I) above, the a, b, and c fulfil the conditions $0 < a \le 0.7$ (for example, $0.3 \le a \le 0.5$), $0 < b \le 0.7$ (for example, $0.3 \le b \le 0.5$), and $0 < c \le 0.7$ (for example, $0.3 \le c \le 0.5$). In another desired embodiment the condition of $a=b=c=\frac{1}{3}$ is fulfilled.

In the positive electrode material 10, as depicted in FIG. 1, one or two or more lithium compounds 14 are disposed in the hollow portions of the positive electrode active material particles 12. By providing such a lithium compound 14, it is possible to suppress the occurrence of fracture (typically, separation of primary particles from each other) in the positive electrode active material particles in repeated charging and discharging of the lithium secondary battery equipped with the positive electrode material 10. As a result, cycle characteristics of the battery using the positive electrode material 10 can be improved. Further, since the lithium compound 14 is disposed inside the hollow portions of the positive electrode active material particles 12 (desirably, no lithium compound is disposed on the outer circumferential surface of the positive electrode active material particles 12), sites where the electrically conductive material comes into contact with the positive electrode active material particles 12 can be advantageously ensured when a positive electrode is fabricated by using the positive electrode material 10. Thus, the electron conductivity of the positive electrode material can be increased. As a result, the increase in resistance of the battery constructed by using the positive electrode material 10 can be suppressed.

The lithium compound 14 can be distinguished from the positive electrode active material particles 12 in that it contains no transition metal. A well-known conventional lithium compound can be used, without any particular limitation, as the lithium compound 14. From the standpoint of suppressing the increase in battery resistance, it is desired that the lithium compound 14 have ion conductivity enabling the conduction of lithium ions (lithium ion conductivity).

Examples of such lithium compound 14 include lithium phosphate, LiPON compound, $Li_2O$—$B_2O_3$ compound, $Li_2O$—$B_2O_3$—LiI compound, $Li_2S$—$SiS_2$ compound, $Li_2S$—$SiS_2$—$Li_3PO_4$ compound, lithium fluoride, lithium acetate, lithium acetylide ethylenediamine, lithium benzoate, lithium bromide, lithium carbonate, lithium nitrate, lithium oxalate, lithium pyruvate, lithium stearate, lithium tartrate, lithium hydroxide, and lithium sulfur phosphate compounds. Among them, lithium phosphate ($Li_3PO_4$) is desired because it excels in lithium ion conductivity and can effectively suppress the occurrence of fracture in the positive electrode active material particles (a high effect of binding together the primary particles constituting the positive electrode active material particles is demonstrated). Thus, the positive electrode material 10 desirably includes at least lithium phosphate as the lithium compound 14.

The amount of the lithium compound 14 in the positive electrode material 10 is not particularly limited, but is desirably from 0.1 part by mass to 4 parts by mass per 100 parts by mass of the positive electrode active material particles. Where the amount of the lithium compound 14 in the positive electrode material 10 is too small, the output increase effect (typically, the effect of suppressing the occurrence of fracture in the positive electrode active material particles) resulting from the presence of the lithium compound 14 in the positive electrode material 10 may not be sufficiently demonstrated. Meanwhile, where the amount of the lithium compound 14 in the positive electrode material 10 is too large, the capacity of the lithium secondary battery constructed using such a positive electrode material 10 may undesirably decrease.

The arrangement of the lithium compound 14 in the positive electrode material 10 can be checked by a typical EPMA (Electron Probe Micro Analyzer) analysis. More specifically, the analysis may be performed by exposing the cross section of the positive electrode material by appropriate pre-treatment and observing the obtained cross section with the EPMA. Such a method makes is possible to determine the amount (typically, a relative amount) of the lithium compound 14 contained in the positive electrode material 10.

A method for manufacturing the positive electrode material will be explained hereinbelow with respect to the case in which at least lithium phosphate is included as the lithium compound in the hollow portions of the positive electrode active material particles.

Figure 5:
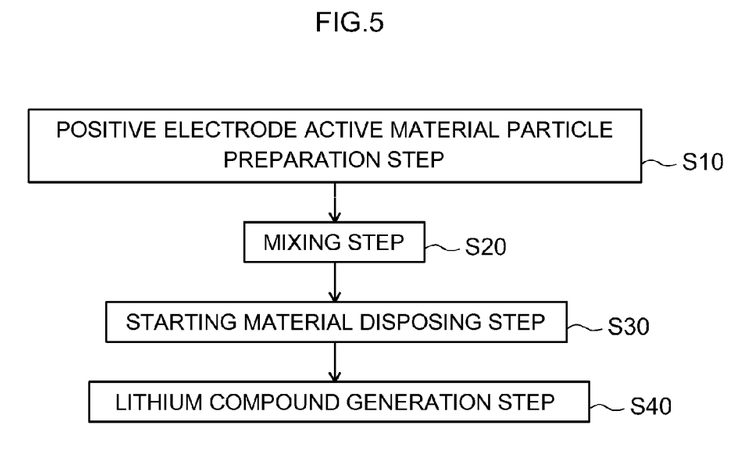
FIG. 5 is a flowchart illustrating the method for manufacturing the positive electrode material according to the embodiment of the present invention.

As depicted in FIG. 5, the method for manufacturing the positive electrode material disclosed herein involves a positive electrode active material particle preparation step (S10), a mixing step of mixing the positive electrode active material particles with a reaction starting material of a lithium compound (mixing step, S20), a step of disposing the reaction starting material of a lithium compound in the hollow portions of the positive electrode active material particles (starting material disposing step, S30), and a step of generating the lithium compound (lithium compound generation step, S40). Those steps will be explained hereinbelow in greater detail.

Initially, the positive electrode active material particle preparation step (S10) will be explained. This step involves the preparation of positive electrode active material particles constituting the positive electrode material. Thus, prepared are the positive electrode active material particles which can reversibly store and release a charge carrier and which have a hollow structure having a shell configured of primary particles and a hollow portion formed inside the shell. The above-described particles (positive electrode active material particles with a hollow structure which has a shell configured of primary particles and a hollow portion formed inside the shell) can be used, without any particular limitation, as the positive electrode active material particles.

The positive electrode active material particles with a hollow structure can be fabricated by a well-known conventional method.

For example, as an embodiment of a method for fabricating positive electrode active material particles configured of a lithium transition metal oxide, a method can be used by which the hydroxide of a transition metal is precipitated (a starting material hydroxide is generated) under suitable conditions from an aqueous solution including at least one (desirably, all of the metal elements other than lithium that are included in the lithium transition metal oxide) transition metal element other than lithium contained in the lithium transition metal oxide constituting the positive electrode active material particles, the resulting starting material hydroxide is mixed with a lithium compound, and the mixture is fired. In this case, the generation of the starting material hydroxide may involve a nucleation step of precipitating the transition metal hydroxide from the aqueous solution under the conditions of a pH being 12 or more and an ammonium ion concentration being 25 g/L or less; and a particle growth step of growing the precipitated transition metal hydroxide under the conditions of a pH being less than 12 and an ammonium ion concentration being 3 g/L or more. The firing may be performed such that the maximum firing temperature is 800° C. to 1100° C. With such a manufacturing method, the positive electrode active material particles having a hollow structure can be advantageously manufactured.

Since the method for fabricating the positive electrode active material particles does not specify the present invention, the detailed explanation thereof is herein omitted.

The mixing step (S20) is explained hereinbelow. This step involves mixing the positive electrode active material particles prepared in the positive electrode active material particle preparation step (S10) with the reaction starting material of a lithium compound (typically, lithium phosphate). The mixing method is not particularly limited, provided that the positive electrode active material particles and the reaction starting material of a lithium compound (typically, lithium phosphate) can be mixed. For example, a method using a well-known mixing device such as a mixer, a blender, a mill, or a kneader can be used.

A conventional well-known reaction starting material of a lithium compound can be used herein without any particular limitations. Lithium nitrate and diammonium hydrogen phosphate can be advantageously used as the reaction starting materials of a lithium compound. When a compound other than lithium phosphate is included as the lithium compound, the reaction starting material for generating the target compound may be selected, as appropriate, and used. From the standpoint of realizing disposing the reaction starting material in the hollow portions of the positive electrode active material particles in the below-described starting material disposing step (S30), it is desired that the reaction starting material be soluble in water.

The mixing ratio of the positive electrode active material particles and the reaction starting material may be set, as appropriate, such as to obtain the desired ratio of the positive electrode active material particles and lithium compound in the positive electrode material.

The starting material disposing step (S30) will be explained hereinbelow. This step involves disposing the reaction starting material of a lithium compound in the hollow portions of the positive electrode active material particles by using moisture in the air or added moisture.

The reaction starting material (typically, lithium nitrate and diammonium hydrogen phosphate) of a lithium compound is dissolved in the moisture in air or added moisture. Therefore, where the moisture in air or added moisture adheres to the surface of the positive electrode active material particles, an aqueous solution is generated on the surface of the positive electrode active material particles, the solution including the reaction starting material of a lithium compound dissolved therein.

The reaction starting material of a lithium compound which has been mixed with the positive electrode active material particles in the mixing step (S20) is typically present on the exterior of the positive electrode active material particles (exterior of the particles). Therefore, an aqueous solution including the reaction starting material of a lithium compound is generated on the outer circumferential surface of the positive electrode active material particles. The reaction starting material of a lithium compound contained in the aqueous solution is typically disposed in the hollow portions present inside the shell via the through holes present in the shells of the positive electrode active material particles.

Where an excess amount of moisture comes into contact with the positive electrode active material particles, the amount of the lithium compound disposed in the hollow portions of the positive electrode active material particles tends to decrease, and the amount of lithium compound disposed on the exterior (typically, on the outer circumferential surface) of the positive electrode active material particles tends to increase. Thus, in order to dispose the lithium compound in the hollow portion of the positive electrode active material particles in the fabrication of the positive electrode material, it is important to generate an aqueous solution including the reaction starting material of the lithium compound at a high concentration on the outer circumferential surface of the positive electrode active material particles. It is not required to explain how a positive electrode material in which the lithium compound is disposed in the hollow portions of the positive electrode active material particles can be obtained by reducing the amount of moisture that comes into contact with the surface of the positive electrode active material particles when fabricating the positive electrode material which is disclosed herein, but for example the following reason therefor can be suggested. For example, the moisture contained in the air or added moisture can adhere both to the outer circumferential surface and inner surface (the surface that is in contract with the hollow portion of secondary particle of the positive electrode active material particle; same hereinbelow) of the positive electrode active material particles, but as a result of the reaction starting material of the lithium compound being present on the exterior of the positive electrode active material particles, a difference occurs between the concentrations of lithium compound in the aqueous solutions generated on the outer circumferential surface and inner surface of the positive electrode active material particles, and the reaction starting material of the lithium compound can be effectively disposed in the hollow portions of the positive electrode active material particles by using this difference in concentration.

In the desired embodiment, the reaction starting material of the lithium compound is disposed in the hollow portions of the positive electrode active material particles by using moisture contained in the air. For example, the reaction starting material of the lithium compound can be efficiently disposed in the hollow portions of the positive electrode active material particles by placing a mixture of the positive electrode active material particles and the reaction starting material of a lithium compound under a high-humidity atmosphere. For example, it is desired that the mixture of the positive electrode active material particles and the reaction starting material of the lithium compound be allowed to stay under an environment with a relative humidity of 80% (80% RH) or higher (desirably, 90% (90% RH) or higher). The mixture may be allowed to stay under such high-humidity atmosphere, for example, for 20 hours or longer (desirably, 24 hours or longer), but this interval of time is not limiting.

The temperature conditions in the starting material disposing step (S30) are not particularly limited, and the temperature can be, for example, 40° C. or higher (typically, 50° C. or higher) and 90° C. or lower (typically, 80° C. or lower). By setting the temperature conditions within this range, it is possible to dispose effectively the reaction starting material of a lithium compound in the hollow portions of the positive electrode active material particles.

The lithium compound generation step (S40) will be explained hereinbelow. This step involves generating a lithium compound (typically, lithium phosphate) from the reaction starting material (typically lithium nitrate and diammonium hydrogen phosphate) of a lithium compound which has been disposed in the hollow portions of the positive electrode active material particles in the starting material disposing step (S30). As a result, the lithium compound (typically, lithium phosphate) is disposed in the hollow portions of the positive electrode active material particles.

For example, where lithium phosphate is to be generated, a mixture of lithium nitrate and diammonium hydrogen phosphate may be heat treated. Thus, the positive electrode active material particles in the hollow portions of which the reaction starting material of the lithium compound has been disposed may be heat treated. The temperature and time of the heat treatment can be set, as appropriate, according to the composition of the positive electrode material. Thus, the heat treatment may be performed for about 3 hours to 24 hours (for example, at least for 4 hours or more) at a heat treatment temperature from, for example, 300° C. to 500° C. (for example, at about 400° C.).

The method for manufacturing the positive electrode material disclosed herein may further include a step of removing extra moisture by drying (drying step) after the starting material disposing step (S30) and before the lithium compound generation step (S40). The drying method is nor particularly limited, and the well-known conventional drying methods such as hot-air drying and reduced-pressure drying (vacuum drying) can be used. The drying may be performed, for example, at from 80° C. to 200° C. (for example, at about 100° C.).

An embodiment of the lithium secondary battery using the positive electrode material disclosed herein will be explained hereinbelow with reference, as appropriate, to the appended drawings, but the present invention is not intended to be limited to this embodiment.

The "secondary battery" as referred to in the present specification is a term generally representing a battery capable of repeated charging and discharging and is inclusive of the so-called chemical batteries such as a lithium secondary batteries, a sodium secondary battery, and a nickel hydride secondary batteries and also physical batteries such as a double-layer electric capacitor. Further, the "lithium secondary battery", as referred to in the present specification, is a secondary battery which uses lithium ions as charge carriers (support salt, support electrolyte) and is charged and discharged by the movement of lithium ions between positive and negative electrodes.

The lithium secondary battery disclosed herein includes a positive electrode, a negative electrode, and a nonaqueous electrolyte. An electrode body having the positive electrode and negative electrode and the nonaqueous electrolyte are typically accommodated in an outer case (typically, a battery case). The shape of the outer case (typically, a battery case) is not particularly limited, and the outer case can be bag-like, cylindrical, or cubical (box-like). The configuration of the electrode body is not particularly limited and can be a stack-type electrode body (stacked electrode body) or a wound-type electrode body (wound electrode body).

Figure 2:
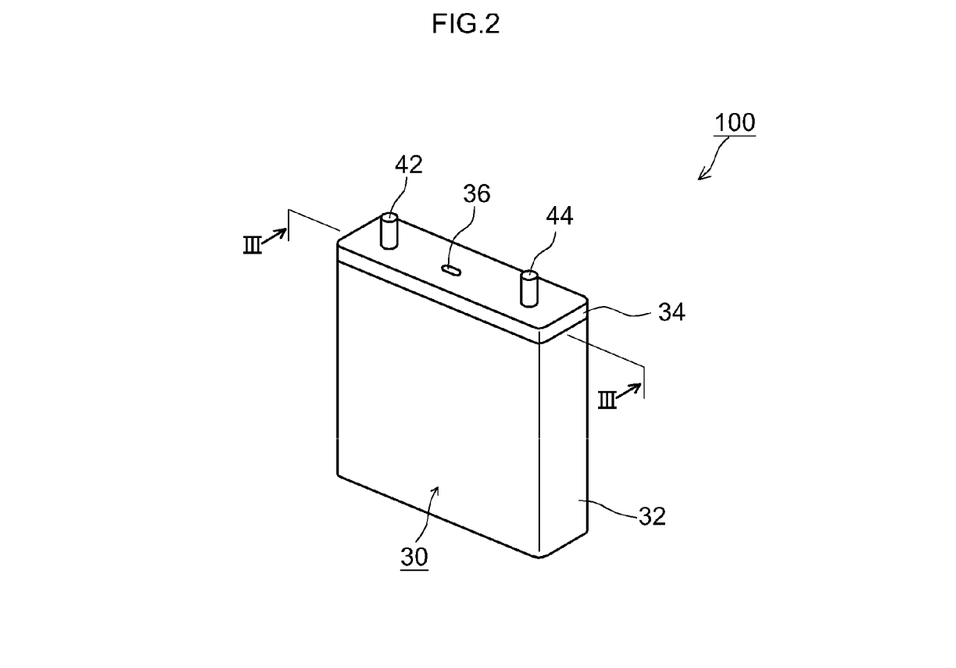
FIG. 2 is perspective view illustrating schematically the outer shape of the lithium secondary battery according to the embodiment.
Figure 3:
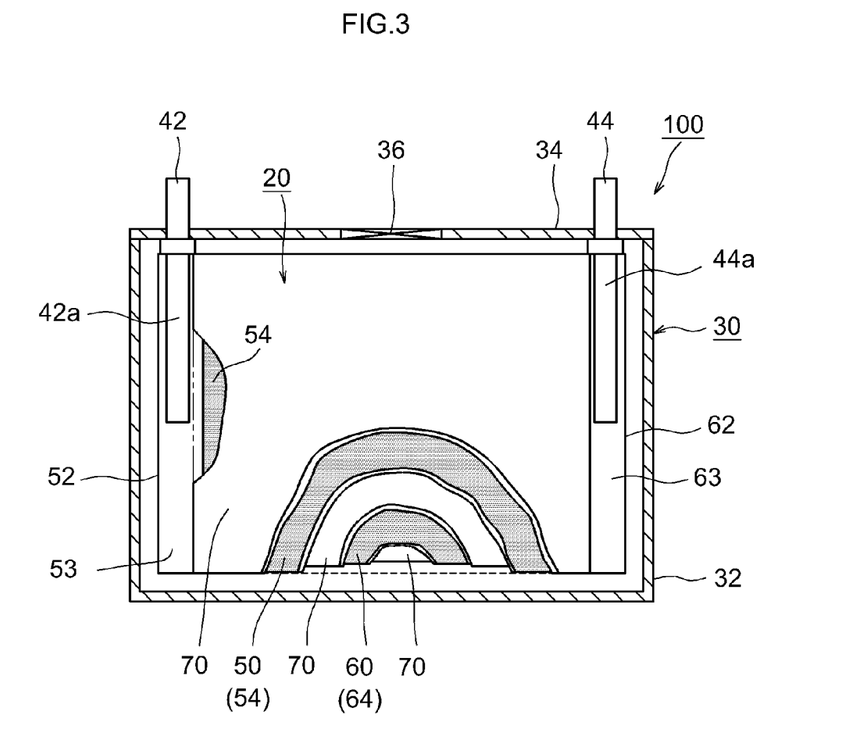
FIG. 3 is a vertical sectional view along the line in FIG. 2.

A battery configured such that a wound electrode body 20 is accommodated in a battery case 30 of a rectangular parallelepiped shape will be explained hereinbelow in a simple manner by way of example as the desired embodiment of the lithium secondary battery disclosed herein.

As depicted in FIGS. 2 and 3, the battery case 30 can be configured of a case main body 32 of a bottomed flat box-like shape (typically, in the form of a rectangular parallelepiped) having an opening at one end (corresponds to the upper end in the usual usage state of the battery), and a lid 34 closing the opening of the case main body 32. As depicted in the figures, a positive electrode terminal 42 and a negative electrode terminal 44 for external connection are provided to the lid 34 so that a portion of each terminal protrudes from the lid 34 to the outside of the battery 100. The lid 34 is also provided with a safety valve 36 which has been set to release the internal pressure of the battery case, and a pouring port (not depicted in the figures) for pouring a nonaqueous electrolyte into the battery case. The battery case is desirably made, for example, of a lightweight metal material (for example, aluminum) having good thermal conductivity.

Figure 4:
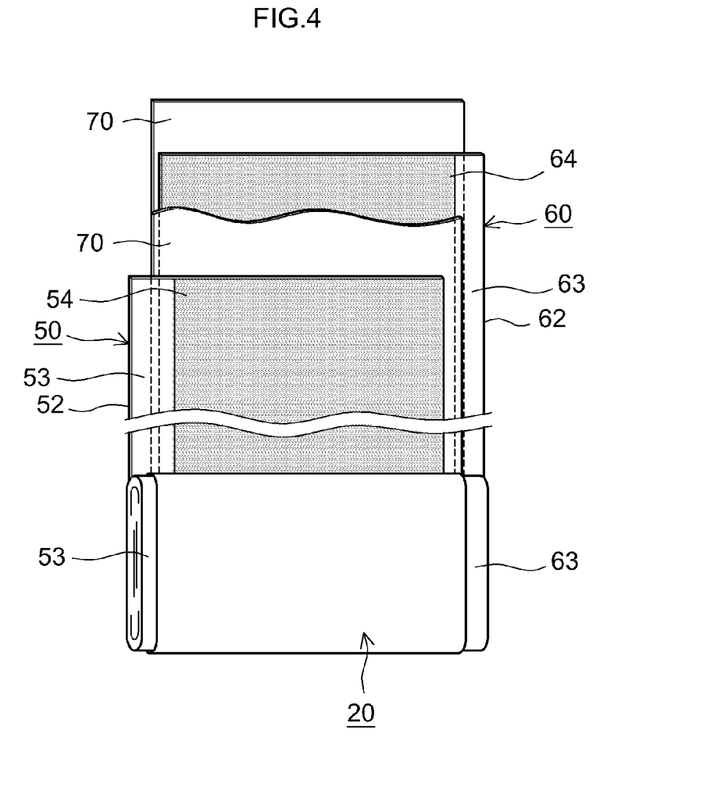
FIG. 4 is a schematic view illustrating the configuration of a wound electrode body according to the embodiment.

As depicted in FIGS. 3 and 4, the wound electrode body 20 is obtained by laminating (stacking) a positive electrode 50 in which a positive electrode active material layer 54 is formed along the longitudinal direction on one or both surfaces (in this case, on both surfaces) of an elongated positive electrode collector 52, and a negative electrode 60 in which a negative electrode active material layer 64 is formed along the longitudinal direction on one or both surfaces (in this case, on both surfaces) of an elongated negative electrode collector 62, with two elongated separators 70 being interposed therebetween, and then winding the laminate in the longitudinal direction. Such a flat-shaped wound electrode body 20 can be formed, for example, by laminating the positive electrode 50, the negative electrode 60, and the separators 70, winding the laminate, and then squashing (pressing) and flattening out the wound body in one direction (typically, from the side direction) perpendicular to the winding axis.

As depicted in FIGS. 3 and 4, the wound electrode body 20 is obtained by winding the positive electrode and negative electrode which are laminated with a certain displacement in the width direction such that a positive electrode collector exposed end portion 53 (that is, a portion where the positive electrode active material layer 54 is not formed and the positive electrode collector 52 is exposed) and a negative electrode collector exposed end portion 63 (that is, a portion where the negative electrode active material layer 64 is not formed and the negative electrode collector 62 is exposed) protrude to the outside from both ends in the winding axis direction, but such a configuration is not particularly limiting. As a result, a wound core in which the positive electrode 50, the negative electrode 60, and the separators 70 are laminated and wound is formed in the central portion, in the winding axis direction, of the wound electrode body 20. Further, as depicted in FIG. 3, in the positive electrode 50 and the negative electrode 60, the positive electrode collector exposed end portion 53 and the positive electrode terminal 42 (for example, made of aluminum) can be electrically connected through a positive electrode current collector plate 42a, and the negative electrode collector exposed end portion 63 and the negative electrode terminal 44 (for example, made of nickel) can be electrically connected through a negative electrode current collector plate 44a. The positive and negative electrode current collection plates 42a, 44a and the positive and negative electrode collector exposed end portions 53, 63 (typically, the positive and negative electrode collectors 52, 62) can be respectively joined to each other, for example, by ultrasonic welding or resistance welding.

In the lithium secondary battery 100 disclosed herein, the wound electrode body 20 can be accommodated in the case main body 32 in a posture such that the winding axis of the wound electrode body 20 is sideways (that is, the opening is formed in the direction normal to the winding axis of the wound electrode body 20). For example, the wound electrode body 20 can be accommodated inside the battery case main body 32 from the opening of the battery case main body 32, and the opening of the case main body 32 can be thereafter closed by the lid 34, thereby accommodating the wound electrode body 20 inside the battery case 30. The lid 34 and the case main body 32 may be joined by welding, or the like.

The positive electrode 50 includes the positive electrode collector 52 and the positive electrode active material layer 54 which includes at least the positive electrode material 10 (that is, the positive electrode material in which the lithium compound 14 is disposed inside the hollow portions of the positive electrode active material particles 12) and which is formed on one or both surfaces of the positive electrode collector 52. For example, an aluminum foil can be advantageously used as the positive electrode collector 52.

The positive electrode active material layer 54 can also include components other than the positive electrode material 10, for example, an electrically conductive material and a binder. A carbon black such as acetylene black or other carbon materials (graphite, etc.) can be advantageously used as the electrically conductive material. PVdF and the like can be used as the binder. The amount of the positive electrode material in the positive electrode active material layer can be set such that ratio of the positive electrode active material in the positive electrode active material layer exceeds about 50% by mass and is within a range of about 90% by mass to 99% by mass (for example, 95% by mass to 99% by mass, typically 97% by mass to 99% by mass).

Such a positive electrode 50 can be formed, for example, by dispersing the positive electrode material 10 (that is, the positive electrode material in which the lithium compound 14 is disposed in the hollow portions of the positive electrode active material particles 12) and an optionally used material in an appropriate solvent (for example, N-methyl-2-pyrrolidone), preparing a paste-like (slurry-like) composition, applying the appropriate amount of the composition to the surface of the positive electrode collector 52, and then drying. If necessary, the properties (for example, average thickness, active material density, porosity, and the like) of the positive electrode active material layer 54 can be adjusted by performing the appropriate press processing.

The negative electrode 60 includes the negative electrode collector 62 and the negative electrode active material layer 64 which includes at least the negative electrode active material and is formed on one or both surfaces of the negative electrode collector 62. For example, a copper foil can be advantageously used as the negative electrode collector 62.

One or two or more substances which have been conventionally used in lithium ion batteries can be used, without any particular limitation, as the negative electrode active material. For example, a carbon material having a graphite structure (layered structure) in at least part thereof and a lithium transition metal nitride can be used. The so-called graphite-like materials (graphite), hardly graphitizable carbonaceous material (hard carbon), easily graphitizable carbonaceous material (soft carbon), and carbon materials, for example, having a combined structure thereof can be advantageously used. Among them, it is particularly desired that graphite particles of natural graphite be used. For example, carbon particles in which amorphous carbon is applied to the surface of graphite may be also used.

The negative electrode active material layer 64 can include, for example, a binder and a thickening agent in addition to the active material. A styrene-butadiene rubber (SBR) and the like can be used as the binder. For example, carboxymethyl cellulose (CMC) can be used as the thickening agent. The amount of the negative electrode active material in the negative electrode active material layer 64 can be above about 50% by mass, more specifically about 90% by mass to 99% by mass (for example, 95% by mass to 99% by mass, typically 97% by mass to 99% by mass).

Such a negative electrode 60 can be formed, for example, by dispersing the negative electrode active material and an optionally used material in an appropriate solvent (for example, water), preparing a paste-like (slurry-like) composition, applying the appropriate amount of the composition to the surface of the negative electrode collector 62, and then drying. If necessary, the properties (for example, average thickness, active material density, porosity, and the like) of the negative electrode active material layer 64 can be adjusted by performing the appropriate press processing.

Well-known conventional materials can be used, without any particular limitation, for the separator 70. For example, a porous sheet (film) configured of a resin such as polyethylene (PE), polypropylene (PP), polyesters, cellulose, and polyamides can be used. The porous sheet may have a monolayer structure or a laminated structure including two or more layers (for example, a three-layer structure in which PP layers are laminated on both surfaces of a PE layer).

The form of the nonaqueous electrolyte is not particularly limited, and it can be in a liquid, gel-like, or solid form. Typically, a nonaqueous electrolytic solution can be used in which a support salt is contained in an organic solvent (nonaqueous solvent). Such a nonaqueous electrolytic solution is in a liquid state at a normal temperature (for example, 25° C.), and in a desired embodiment, it is in a liquid state at all times under the battery usage environment (for example, the environment with a temperature of 0° C. to 60° C.).

Various organic solvents such as carbonates, ethers, esters, nitriles, sulfones, and lactones, which are used for the electrolytic solution of a typical lithium secondary battery, can be used as the nonaqueous solvent. Specific examples include ethylene carbonate (EC), propylene carbonate (PC), diethyl carbonate (DEC), dimethyl carbonate (DMC), and ethyl methyl carbonate (EMC). Such nonaqueous solvents can be used individually or in an appropriate combination of two or more thereof. Among them, EC which has a high specific dielectric constant and DMC or EMC which has a high oxidation potential (a wide potential window) can be advantageously used.

A support salt same as that of the typical lithium secondary battery can be used. Examples thereof include lithium salts such as $LiPF_6$, $LiBF_4$, $LiClO_4$, and $LiAsF_6$ (desirably $LiPF_6$). Such support salts can be used individually or in an appropriate combination of two or more thereof. The desired concentration range of the support salt in the nonaqueous electrolyte is 0.7 mol/L to 1.3 mol/L (for example, 1.1 mol/L).

A component (an additive) other than the nonaqueous solvent and support salt can be included in the nonaqueous electrolyte, provided that the effect of the present invention is not significantly impaired. Examples of such additives include film-forming agent, gas-generating agents, dispersants, and thickening agents.

The positive electrode material disclosed herein excels in durability (positive electrode active material particles are unlikely to fracture even in repeated charging and discharging) and has a high electron conductivity (a low battery resistance). Therefore, such a positive electrode material is suitable for lithium secondary batteries for a variety of applications, and can be advantageously used, by making use of such a property, as a positive electrode material for lithium secondary batteries to be used as drive power sources installed on vehicles. The vehicle type is not particularly limited, and examples of suitable vehicles include plug-in hybrid vehicles (PHV), hybrid vehicles (HV), electric vehicle (EV), electric trucks, motor bikes, power-assisted bicycles, electric wheelchairs, and electric trains.

Further, by using such a positive electrode material, it is possible to provide a lithium secondary battery that excels in output characteristics (typically, a low battery resistance) and durability (typically, cycle characteristics), or a vehicle using the lithium secondary battery desirably as a power source.

Several examples (test examples) relating to the present invention will be explained hereinbelow, but the present invention is not intended to be limited to those specific examples.

[Fabrication of Positive Electrode Material]

Positive electrode materials according to Examples 1 to 13 were fabricated by using the following materials and processes.

Example 1

Initially, positive electrode active material particles with a hollow structure that had a shell configured of primary particles, and a hollow portion formed inside each shell were prepared. The composition of the positive electrode active material particles is represented by $Li_{1.15}Ni_{0.33}Co_{0.33}Mn_{0.33}O_2$.

Then the positive electrode active material particles fabricated in the above-described manner and lithium nitrate and diammonium hydrogen phosphate, which were the reaction starting materials of lithium phosphate, were mixed. More specifically, 0.16 part by mass of lithium nitrate and 0.089 part by mass of diammonium hydrogen phosphate were agitated and mixed with 89 parts by mass of the positive electrode active material particles by using a powder mixer (NOB-MINI) manufactured by Hosokawa Micron Corporation. The shear velocity during agitating and mixing was 35 rpm. The mixture of the positive electrode active material particles and reaction starting materials of the lithium compound was allowed to stand for 24 hours under an environment with a relative humidity of 90% (90% RH) and a temperature of 60° C., and then vacuum dried at 100° C. After the reaction starting materials of lithium phosphate had thus been disposed in the hollow portions of the positive electrode active material particles, heat treatment was performed for 4 hours under a temperature condition of 400° C. The positive electrode material (Example 1) was thus obtained in which lithium phosphate was disposed in the hollow portions of the positive electrode active material particles. In this case, the amount of lithium phosphate in the positive electrode material was 0.1 part by mass per 100 parts by mass of the positive electrode active material particles.

Examples 2 to 6

Positive electrode materials of Examples 2 to 6 were obtained by using the same materials and processes as in Example 1, except that the mixing ratio of the positive electrode active material particles and lithium nitrate and diammonium hydrogen phosphate, which were the reaction starting materials of lithium phosphate, was changed such as to obtain the amount of lithium phosphate ($Li_3PO_4$) in the positive electrode material which is represented in Table 1. The value of lithium phosphate indicated in Table 1 represents the amount (parts by mass) of lithium phosphate in the positive electrode material when the amount of the positive electrode active material particles is taken as 100 parts by mass.

Example 7

The positive electrode active material particles used in the positive electrode material according to Example 1 were used, without any change, as the positive electrode material according to Example 7 (that is, no lithium phosphate was included).

Example 8

The positive electrode active material particles same as those in Example 1 were prepared. Then, the positive electrode active material particles and lithium nitrate and diammonium hydrogen phosphate, which were the reaction starting materials of lithium phosphate, were mixed together. More specifically, 0.16 part by mass of lithium nitrate and 0.089 part by mass of diammonium hydrogen phosphate were agitated and mixed with 89 parts by mass of the positive electrode active material particles by using a powder mixer (NOB-MINI) manufactured by Hosokawa Micron Corporation. The shear velocity during agitating and mixing was 35 rpm. The mixture of the positive electrode active material particles and reaction starting materials of the lithium compound was heat treated for 4 hours under a temperature condition of 400° C. The positive electrode material (Example 8) was thus obtained in which lithium phosphate was disposed on the exterior (typically, on the outer circumferential surface) of the positive electrode active material particles. In this case, the amount of lithium phosphate in the positive electrode material was 0.1 part by mass per 100 parts by mass of the positive electrode active material particles.

Examples 9 to 13

Positive electrode materials of Examples 9 to 13 were obtained by using the same materials and processes as in Example 8, except that the mixing ratio of the positive electrode active material particles and lithium nitrate and diammonium hydrogen phosphate, which were the reaction starting materials of lithium phosphate, was changed such as to obtain the amount of lithium phosphate ($Li_3PO_4$) in the positive electrode material which is represented in Table 1. The value of lithium phosphate indicated in Table 1 represents the amount (parts by mass) of lithium phosphate in the positive electrode material when the amount of the positive electrode active material particles is taken as 100 parts by mass.

The positive electrode materials of the examples that had been fabricated in the above-described manner were investigated by the EPMA line analysis of the cross section thereof. For the positive electrode materials of Examples 1 to 6, the presence of lithium phosphate in the hollow portions of the positive electrode active material particles was confirmed. Further, in the positive electrode materials of Examples 1 to 6, lithium phosphate was not present on the outer circumferential surface of the positive electrode active material particles. Meanwhile, for the positive electrode materials of Examples 8 to 13, the presence of lithium phosphate on the exterior (typically outer circumferential surface) of the positive electrode active material particles was confirmed.

Those results have confirmed that the method disclosed herein makes it possible to fabricate a positive electrode material in which a lithium compound (in this case, lithium phosphate) is disposed in the hollow portions of the positive electrode active material particles, and lithium phosphate is not disposed on the outer circumferential surface of the positive electrode active material particles.

[Construction of Lithium Secondary Battery]

Lithium secondary batteries of Examples 1 to 13 were constructed by using the positive electrode materials of Examples 1 to 13 fabricated in the above-described manner. The lithium secondary batteries of Examples 1 to 13 were fabricated by using the same materials and processes, except that the positive electrode materials of the aforementioned examples were used.

A paste-like (slurry-like) composition for forming a positive electrode active material layer was prepared by mixing one of the positive electrode materials of Examples 1 to 13, which had been fabricated in the above-described manner, acetylene black (AB) as an electrically conductive material, and polyvinylidene fluoride (PVdF) as a binder at a mass ratio of the positive electrode material:AB:PVdF=100:13:13 with N-methyl pyrrolidone (NMP). The composition was stripe-like coated on both surface of an elongated aluminum foil (positive electrode collector), dried, and pressed to fabricate a positive electrode.

A paste-like (slurry-like) composition for forming a negative electrode active material layer was prepared by dispersing graphite (C) as a negative electrode active material, a styrene-butadiene rubber (SBR) as a binder, and carboxymethyl cellulose (CMC) as a thickening agent at a mass ratio of C:SBR:CMC=98:1:1 in water. The composition was stripe-like coated on both surface of an elongated copper foil (negative electrode collector), dried, and pressed to fabricate a negative electrode.

A flat-shaped wound electrode body was then fabricated by longitudinally laminating the positive electrode and negative electrode, which had been fabricated by the above-described method, with two separators of a three-layer structure in which a porous polypropylene layer was formed on both surfaces of a porous polyethylene layer, winding the laminate in the longitudinal direction, and then collapsing and flattening out the resultant.

The wound electrode body and a nonaqueous electrolyte were then accommodated inside an angular battery case (made of aluminum), thereby constructing batteries of Examples 1 to 13. The nonaqueous electrolyte was prepared by dissolving $LiPF_6$ as a support salt to a concentration of 1 mol/L in a mixed solvent including ethylene carbonate (EC), dimethyl carbonate (DMC), and ethyl methyl carbonate (EMC) at a volume ratio of EC:DMC:EMC=1:1:1.

[Measurement of Battery Resistance (IV Resistance)]

The battery resistance (IV resistance) of the batteries constructed in the above-described manner was measured. Initially, the batteries were adjusted to a state of charge (SOC) of 60% under a temperature condition of 25° C., constant-current discharge was then performed for 10 sec at predetermined discharge rates (in this case, the discharge rates of 0.2 C, 1 C, and 3 C), and the voltage (V) after the discharge was measured. The IV resistance (mΩ) was calculated by dividing the measured voltage (V) by the corresponding current value (typically, the IV resistance (mΩ) is calculated from the slope of a primary approximation line of the plot values of current (I)–voltage (V)), and the average value thereof is taken as a battery resistance.

Figure 6:
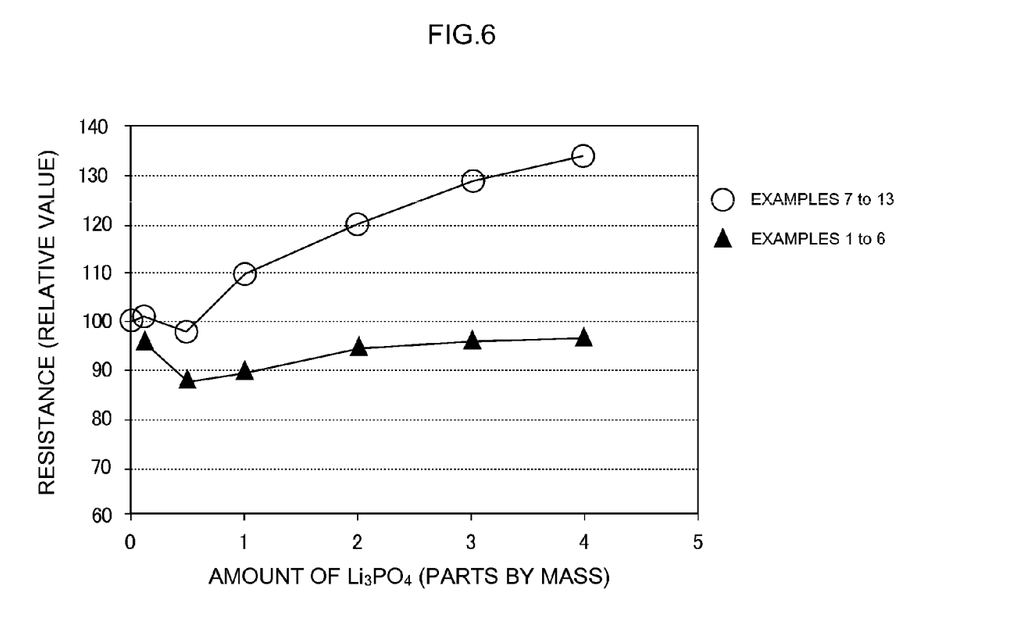
FIG. 6 is a graph representing the relationship between the battery resistance (relative value obtained when the resistance of the battery of Example 7 is taken as 100) obtained when a lithium secondary battery constructed using the positive electrode active material according to the example is charged and the amount of lithium compound (in this case, lithium phosphate) contained in the positive electrode active material.

A relative value of the battery resistance (mΩ) of battery of each example was calculated by taking the battery resistance (mΩ) of the battery of Example 7 as 100. The results are shown in the "Battery resistance (relative value)" in Table 1 and FIG. 6.

If not stated otherwise, the "state of charge (SOC)", as referred to herein, is the state of charge of the battery which is based on the voltage range in which the battery is normally used. For example, it is a state of charge based on the rated capacity measured under the condition of the inter-terminal voltage (open-circuit voltage (OCV)) being 4.1 V (upper limit voltage) to 3.0 V (lower limit voltage).

Further, "1 C" means a current value at which the battery capacity (Ah) predicted from the theoretical capacity can be charged in 1 hour. For example, 1 C=24 A when the battery capacity is 24 Ah.

TABLE 1

| Example | Amount of $Li_3PO_4$ (parts by mass) | Battery resistance (relative value) |
|---|---|---|
| 1 | 0.1 | 96 |
| 2 | 0.5 | 89 |
| 3 | 1 | 90 |
| 4 | 2 | 95 |
| 5 | 3 | 96 |
| 6 | 4 | 97 |
| 7 | 0 | 100 |
| 8 | 0.1 | 101 |
| 9 | 0.5 | 98 |
| 10 | 1 | 110 |
| 11 | 2 | 120 |
| 12 | 3 | 129 |
| 13 | 4 | 134 |

As indicated in Table 1, in the lithium secondary batteries of Examples 1 to 6, the battery resistance was reduced with respect to that of the lithium secondary battery of Example 7. Further, in the lithium secondary batteries of Examples 1 to 6, the battery resistance was reduced with respect to that of the lithium secondary batteries of Examples 8 to 13 which had the same amount of lithium phosphate in the positive electrode material. Thus, the battery resistance that could be realized with the positive electrode material in which a lithium compound (in this case, lithium phosphate) was disposed in the hollow portions of positive electrode active material particles with a hollow structure and in which no lithium compound (in this case, lithium phosphate) was disposed on the exterior (typically, the outer circumferential surface) of the positive electrode active material particles was confirmed to be lower than that with the positive electrode material having a lithium compound (in this case, lithium phosphate) on the exterior (typically, the outer circumferential surface) of the positive electrode active material particles. This is apparently because when a lithium compound (in this case, lithium phosphate) is disposed in the hollow portions of positive electrode active material particles and is not disposed on the outer circumferential surface of the positive electrode active material particles, a wide surface area is ensured over which the positive electrode active material particles can be in contact with the electrically conductive material (in this case, acetylene black) contained in the positive electrode active material layer, and conductive paths are effectively formed between the positive electrode active material particles. Thus, the lithium secondary battery equipped with the positive electrode having the positive electrode material disclosed herein had a low battery resistance and excelled in output characteristics.

The amount of the lithium compound (in this case, lithium phosphate) in the positive electrode active material particles is not particularly limited, but it was confirmed that the positive electrode material including the lithium compound (in this case, lithium phosphate) in the hollow portion in an amount from 0.1 part by mass to 4 parts by mass per 100 parts by mass of the positive electrode active material particles could realize a low battery resistance.

The present invention is explained hereinabove in detail, but the embodiments and examples thereof are merely exemplary, and the invention disclosed herein is inclusive of various changes and modifications of the specific examples.

What is claimed is:

1. A positive electrode material for use in a lithium secondary battery, the positive electrode material comprising:
positive electrode active material particles that can reversibly store and release a charge carrier; and $Li_3PO_4$, wherein
each of the positive electrode active material particles has a hollow structure having a shell configured of primary particles, a hollow portion formed inside the shell, and through holes which spatially connect the hollow portion with the outside through the shell, and $Li_3PO_4$ is disposed inside the hollow portion, and no $Li_3PO_4$ is disposed on an outer circumferential surface of each of the positive electrode active material particles.

2. The positive electrode material according to claim 1, wherein
$Li_3PO_4$ is included in the positive electrode material in an amount from 0.1 part by mass to 4 parts by mass per 100 parts by mass of the positive electrode active material particles.

3. The positive electrode material according to claim 1, wherein the positive electrode active material is a lithium transition metal oxide including at least nickel, cobalt, and manganese.

4. A method for manufacturing the positive electrode material according to claim 1, comprising:

preparing positive electrode active material particles that can reversibly store and release a charge carrier, each of the positive electrode active material particles having a hollow structure having a shell configured of primary particles, a hollow portion formed inside the shell, and through holes which spatially connect the hollow portion with the outside through the shell;

mixing the positive electrode active material particles with a reaction starting material of $Li_3PO_4$;

disposing the reaction starting material of $Li_3PO_4$ at least in hollow portions of the positive electrode active material particles by using moisture in the air or added moisture; and generating $Li_3PO_4$ from the reaction starting material of $Li_3PO_4$ disposed in the hollow portions of the positive electrode active material particles, and disposing $Li_3PO_4$ in the hollow portions of the positive electrode active material particles.

* * * * *